(12) United States Patent
Sim (10) Patent No.: US 9,578,411 B2
(45) Date of Patent: Feb. 21, 2017

(54) ELECTRONIC DEVICE HAVING NOISE REMOVAL FUNCTION

(71) Applicant: Samsung Electronics Co., Ltd., Suwon-si, Gyeonggi-do (KR)

(72) Inventor: Jaeyong Sim, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 48 days.

(21) Appl. No.: 14/657,294

(22) Filed: Mar. 13, 2015

(65) Prior Publication Data

US 2015/0264479 A1 Sep. 17, 2015

(30) Foreign Application Priority Data

Mar. 14, 2014 (KR) .......................... 10-2014-0030599

(51) Int. Cl.
*H04R 1/10* (2006.01)
*G06F 3/16* (2006.01)
*H04R 5/04* (2006.01)

(52) U.S. Cl.
CPC .............. *H04R 1/1083* (2013.01); *G06F 3/16* (2013.01); *H04R 5/04* (2013.01); *H04R 2499/11* (2013.01)

(58) Field of Classification Search
CPC ..... H04R 2499/11; H04R 5/04; H04R 1/1083; G06F 3/16
See application file for complete search history.

(56) References Cited

U.S. PATENT DOCUMENTS

| 7,508,784 | B2 | 3/2009 | Choi |
| 7,702,118 | B2 | 4/2010 | Park et al. |
| 7,769,187 | B1* | 8/2010 | Farrar ................. H04R 1/1041 381/384 |
| 7,822,400 | B1 | 10/2010 | Son |
| 2001/0053228 | A1* | 12/2001 | Jones ................. G10K 11/1788 381/71.6 |
| 2010/0208919 | A1 | 8/2010 | Park et al. |
| 2010/0260362 | A1* | 10/2010 | Sander ................. H04R 1/1041 381/309 |
| 2011/0300874 | A1 | 12/2011 | Chen |
| 2012/0063445 | A1 | 3/2012 | Sim |

* cited by examiner

*Primary Examiner* — Muhammad N Edun
(74) *Attorney, Agent, or Firm* — Jefferson IP Law, LLP (57) ABSTRACT

An electronic device having a noise removal function is provided. The electronic device includes an ear jack interface configured to operatively connect with an earphone, a key recognition unit selectively connected to a microphone contact terminal of the ear jack interface, the key recognition unit being configured to recognize a key input of the earphone, and a switching circuit configured to electrically connect or interrupt the key recognition unit to or from the microphone contact terminal according to a key input of the earphone.

11 Claims, 5 Drawing Sheets

ELECTRONIC DEVICE HAVING NOISE REMOVAL FUNCTION

CROSS-REFERENCE TO RELATED APPLICATION(S)

This application claims the benefit under 35 U.S.C. §119(a) of a Korean patent application filed on Mar. 14, 2014 in the Korean Intellectual Property Office and assigned Serial number 10-2014-0030599, the entire disclosure of which is hereby incorporated by reference.

TECHNICAL FIELD

The present disclosure relates to an electronic device having a noise removal function.

BACKGROUND

An earphone may output audio signals. The earphone is generally connected to an electronic device through a three-pole or four-pole terminal Recent electronic devices employ a four-pole earphone for voice communications through the earphone. The four-pole earphone may include a microphone terminal, a ground terminal, a right sound terminal, and a left sound terminal. If the four-pole earphone is connected, the electronic device may output an audio signal through the earphone or input an audio signal through a microphone on the earphone. The electronic device may supply power (hereinafter, microphone bias power) for driving a microphone of the four-pole earphone, through a microphone terminal, when detecting connection of the four-pole earphone.

In addition, the electronic device may receive various signals for keys (e.g., a communication key, a volume key, a playback/stop key, a forward key, and a backward key) from the earphone. The various key signals may be input to the electronic device through the microphone terminal of the four-pole earphone. For example, the four-pole earphone may include a plurality of keys. The plurality of keys may include resistances selectively connected to the microphone terminal according to a key input. The resistances of the keys may have different values.

The microphone bias voltage may be changed according to a resistance of the input (pushed) key. The electronic device may identify the type of the input key through the changed microphone bias voltage.

The above information is presented as background information only to assist with an understanding of the present disclosure. No determination has been made, and no assertion is made, as to whether any of the above might be applicable as prior art with regard to the present disclosure.

SUMMARY

An electronic device according to the related art receives a microphone signal and a key input signal through a microphone terminal of a four-pole earphone. For example, the electronic device according to the related art may include a microphone signal line connected to a microphone terminal, for receiving a microphone signal, and a key signal line connected to the microphone terminal, for receiving a key signal.

Meanwhile, the key signal line of the electronic device has a generally long and complex structure. Due to this, various noise (e.g., time division communication noise, power noise, and the like) of the electronic device can be induced in the key signal line. The noise induced in the key signal line may act as an unnecessary noise source when a voice is transmitted or received or recorded, causing an uncomfortable feeling to the user.

Aspects of the present disclosure are to address at least the above-mentioned problems and/or disadvantages and to provide at least the advantages described below. Accordingly, an aspect of the present disclosure is to provide a circuit and apparatus for preventing induction of noise through a key signal line.

In accordance with an aspect of the present disclosure, an electronic device having a noise removal function is provided. The electronic device includes an ear jack interface configured to operatively connect with an earphone, a key recognition unit selectively connected to a microphone contact terminal of the ear jack interface, the key recognition unit being configured to recognize a key input of the earphone, and a switching circuit configured to electrically connect or interrupt (or disconnect) the key recognition unit to or from the microphone contact terminal according to a key input of the earphone.

Various embodiments of the present disclosure can interrupt noise induced in a microphone signal line through a key signal line. In addition, various embodiments of the present disclosure can maintain an operation of a key of an existing earphone.

Other aspects, advantages, and salient features of the disclosure will become apparent to those skilled in the art from the following detailed description, which, taken in conjunction with the annexed drawings, discloses various embodiments of the present disclosure.

BRIEF DESCRIPTION OF THE DRAWINGS

The above and other aspects, features, and advantages of certain embodiments of the present disclosure will be more apparent from the following description taken in conjunction with the accompanying drawings, in which.

Throughout the drawings, it should be noted that like reference numbers are used to depict the same or similar elements, features, and structures.

DETAILED DESCRIPTION disclosure The following description with reference to the accompanying drawings is provided to assist in a comprehensive understanding of various embodiments of the present disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the present disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the present disclosure. Accordingly, it should be apparent to those skilled in the art that the following description of various embodiments of the present disclosure is provided for illustration purpose only and not for the purpose of limiting the present disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Figure 1:
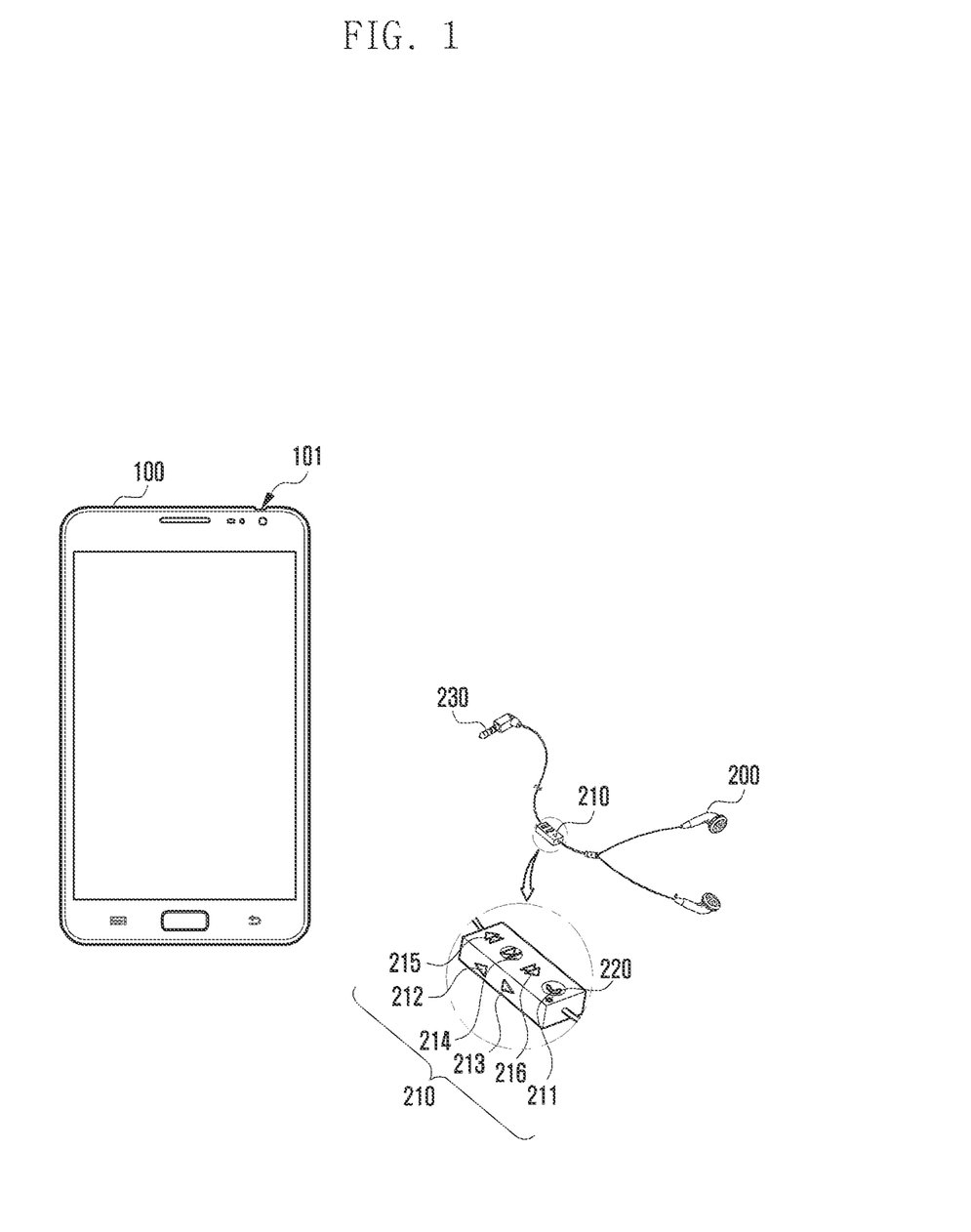
FIG. 1 is a view illustrating an earphone and an electronic device connected to the earphone according to an embodiment of the present disclosure.

FIG. 1 is a view illustrating an earphone and an electronic device connected to the earphone according to an embodiment of the present disclosure.

Referring to FIG. 1, an earphone 200 may be connected to an electronic device 100. The earphone 200 may include a key input unit 210, a microphone 220, and a plug 230.

The key input unit 210 may include at least one key. For example, the key input unit 210 may include a voice communication key 211, a volume-up key 212, a volume-down key 213, a play/stop key 214, a backward key 215, and a forward key 216.

The microphone 220 may collect audio signals. The collected audio signals may be transmitted to the electronic device 100 through a microphone terminal. The microphone 220 may receive electric power (hereinafter, a microphone bias power) for driving from the electronic device 100. The microphone bias power is supplied through a microphone terminal.

The plug 230 may be inserted into an ear jack interface 101. The plug 230 may include four poles. For example, the plug 230 may include a microphone terminal, a ground terminal, a right sound terminal, and a left sound terminal.

The earphone 200 may be mounted on the electronic device 100. For example, the electronic device 100 may include an ear jack interface 101 into which the plug 230 of the earphone 200 is inserted (mounted). The ear jack interface 101 may include four poles. For example, the ear jack interface 101 may include a microphone contact terminal contacting the microphone terminal of the earphone 200 when the earphone 200 is mounted, a ground contact terminal contacting the ground terminal of the earphone 200, a right sound contact terminal contacting the right sound terminal of the earphone 200, and a left sound contact terminal contacting the left sound terminal of the earphone 200.

If the plug 230 of the earphone 200 is inserted into the ear jack interface 101, the electronic device 100 may output an audio signal to the earphone 200. For example, the electronic device 100 may output a communication reception sound, a letter message sound, an audio signal due to the playback of music or a video through the earphone 200. The electronic device 100 may receive a microphone signal or a key signal from the earphone 200. For example, the electronic device 100 may receive a communication transmission sound through the microphone 220 of the earphone 200. Alternatively, the electronic device 100 may receive a key signal due to input of a communication key, a volume key, a music playback control key, and the like of the earphone 200.

The electronic device 100 according to an embodiment of the present disclosure may control connection or interruption (disconnection) of a transmission path of a key signal according to input of a key of the earphone 200. For example, the electronic device 100 may electrically interrupt transmission of a key signal when an input of a key of the earphone 200 is not detected, and may electrically connect the transmission of a key signal when a key of the earphone 200 is input. Accordingly, the electronic device 100 may include a switching circuit for controlling the transmission of a key signal. The switching circuit will be described below with reference to FIGS. 2A and 2B.

Figure 2A:
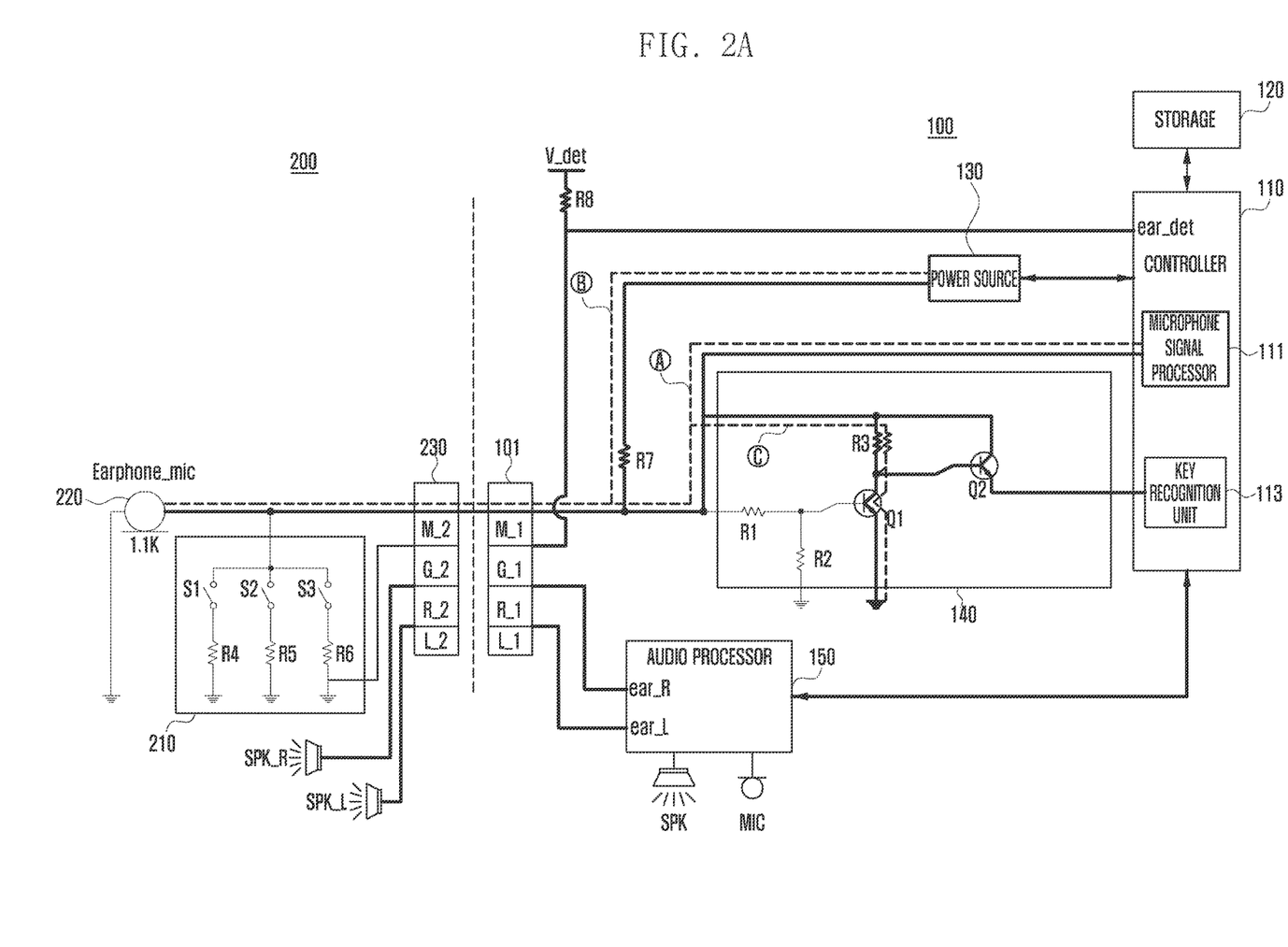
FIGS. 2A and 2B are views schematically illustrating an earphone and an electronic device according to an embodiment of the present disclosure.
Figure 2B:
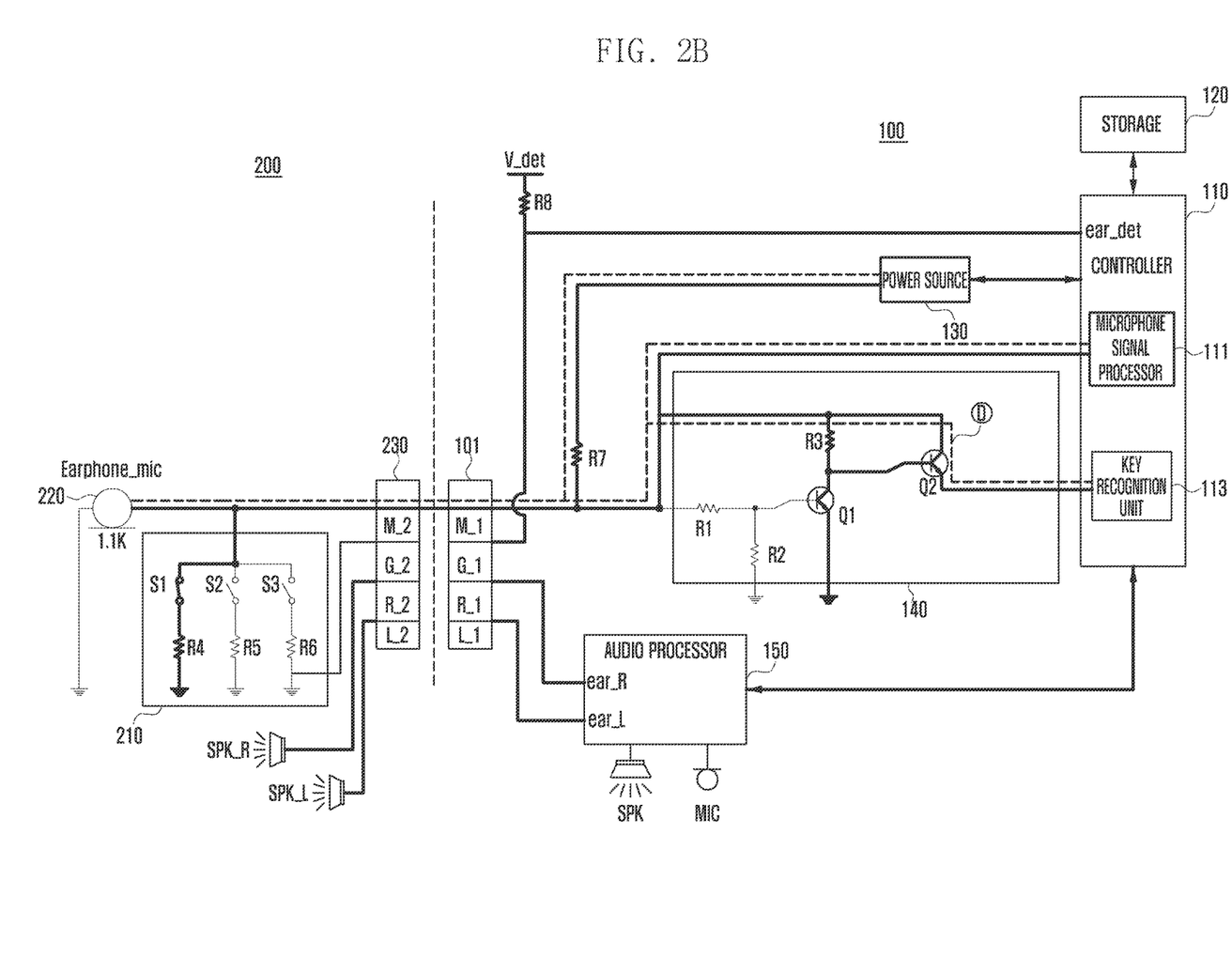

FIGS. 2A and 2B are views schematically illustrating an earphone and an electronic device according to an embodiment of the present disclosure.

Referring to FIGS. 2A and 2B, if the plug 230 of the earphone 200 is mounted on (inserted into) the ear jack interface 101, the controller 110 of the electronic device 100 may detect that the earphone 200 is mounted through a detection terminal ear_det. In detail, the detection terminal ear_det may receive a high signal having a voltage (e.g., 2.8 V) of a predetermined value or more due to a pull-up resistance R8 connected to a detection power source when the earphone 200 is not mounted. Meanwhile, when the earphone 200 is mounted, the detection terminal ear_det is connected to the ground of the earphone 200 through a ground contact terminal G_1 of the ear jack interface 101 and a ground terminal G_2 of the earphone 200 to receive a low signal having a voltage or lower (e.g., several to several hundred mV). In this way, the controller 110 may recognize that the earphone 200 is mounted when a signal input to the detection terminal ear_det is changed from a high level to a low level. However, various embodiments of the present disclosure are not limited thereto. For example, in another embodiment of the present disclosure, a detection circuit may be realized such that the earphone 200 is recognized that to have been mounted when a signal input through the detection is changed from a low level to a high level. The detection circuit for the earphone 200 is well known in the related art, and thus a detailed description thereof will be omitted.

If the earphone 200 is mounted, the controller 110 may control an audio processor 150 such that an audio signal is output through speakers SPK_R and SPK_L of the earphone 200 instead of the speaker SPK of the electronic device 100. To achieve this, an earphone right output terminal ear_R of the audio processor 150 may be connected to the right speaker SPK_R through the right sound contact terminal R_1 and the right sound terminal R_2. An earphone left output terminal ear_L of the audio processor 150 may be connected to the left speaker SPK_L through the left sound contact terminal L_1 and the left sound terminal L_2. The controller 110 may deactivate the microphone MIC of the audio processor 150, and may collect audio signals through the microphone 220 of the earphone 200.

When the earphone 200 is recognized to be mounted, the controller 110 may supply microphone bias power to the microphone 220 of the earphone 200 by switching on the power source 130. For example, as indicated by a dotted line B of FIG. 2A, the power source 130 may supply the microphone bias power to the microphone 220 through a microphone contact terminal M_1 of the ear jack interface 101 and a microphone terminal M_2 of the earphone 200. As indicated by a dotted line A, a microphone signal input from the microphone 220 of the earphone 200 may be transmitted to a microphone signal processor 111 of the controller 110 through the microphone terminal M_2 of the earphone 200 and the microphone contact terminal M_1 of the ear jack interface 101. The microphone signal processor 111 may convert an analog signal to a digital signal. For example, the microphone signal processor 111 may convert the voice of a user input through the microphone 220 during a voice communication through the earphone to a digital signal. The microphone signal processor 111 may be a vocoder.

The controller 110 may recognize an key input of the earphone 200 through a key recognition unit 113. The key recognition unit 113 may be an analog-digital converter (ADC). The controller 110 may identify the type of a key input from the earphone 200 through a voltage value input to the key recognition unit 113. When a key is not input, a microphone bias resistance is distributed to the key recognition unit 113 according to a ratio of a microphone resistance to a bias resistance R7 to be input. For example, a voltage of Equation 1 may be input to the key recognition unit 113.

$$\text{Microphone bias voltage} \times \frac{\text{Resistance of microphone}}{R7 + \text{Resistance of microphone}} \quad \text{Equation 1}$$

When a first key S1 is input, a voltage of Equation 2 may be input to the key recognition unit 113.

$$\text{Microphone bias voltage} \times \frac{\text{Resistance of microphone}//R4}{R7 + (\text{Resistance of microphone}//R4)} \quad \text{Equation 2}$$

Microphone resistance//R4 refers to a parallel synthesized resistance of a microphone resistance and R4. For example, Microphone resistance//R4 may be calculated in Equation 3.

$$\text{Resistance of microphone}// \quad \text{Equation 3}$$
$$R4 = \frac{\text{Resistance of microphone} \times R4}{(\text{Resistance of microphone} + R4)}$$

When a second key S2 is input, a voltage of Equation 4 may be input to the key recognition unit 113.

$$\text{Microphone bias voltage} \times \frac{\text{Resistance of microphone}//Re}{R7 + (\text{Resistance of microphone}//Re)} \quad \text{Equation 4}$$

When a third key S3 is input, a voltage of Equation 5 may be input to the key recognition unit 113.

$$\text{Microphone bias voltage} \times \frac{\text{Resistance of microphone}//Re}{R7 + (\text{Resistance of microphone}//Re)} \quad \text{Equation 5}$$

A storage 120 of the electronic device 100 may store a key recognition table (not shown). The key recognition table (not illustrated) is a table in which voltage values of a predetermined range and specific keys are mapped with each other.

The electronic device 100 according to an embodiment of the present disclosure may include a switching circuit 140 for switching a key recognition circuit. For example, the switching circuit 140 may electrically connect or interrupt the microphone contact terminal M_1 of the ear jack interface 101 to or from the key recognition unit 113.

When a key of the earphone 200 is not input, the switching circuit 140 may electrically interrupt the microphone contact terminal M_1 of the ear jack interface 101 from the key recognition unit 113, and when a key of the earphone 200 is input, the microphone contact terminal M_1 of the ear jack interface 101 may be electrically connected to the key recognition unit 113.

The switching circuit 140 may include a first resistor R1, a second resistor R2, a third resistor R3, a first switching element Q1, and a second switching element Q2.

One side of the first resistor R1 may be connected to the microphone contact terminal M_1 of the ear jack interface 101, and an opposite side of the first resistor R1 may be connected to the second resistor R2 and a control terminal (e.g., a base terminal) of the first switching element Q1.

One side of the second resistor R2 may be connected to the first resistor R1 and the control terminal of the first switching element Q1, and an opposite side of the second resistor R2 may be grounded.

One side of the third resistor R3 may be connected to the microphone contact terminal M_1 of the ear jack interface 101, one side of the first resistor R1, and an input terminal (collector terminal) of the second switching element Q2, and an opposite side of the third resistor R3 may be connected to an input terminal (collector terminal) of the first switching element Q1 and a control terminal of the second switching element Q2.

A control terminal of the first switching element Q1 may be connected to an opposite side of the first resistor R1 and one side of the second resistor R2, an input terminal of the first switching element Q1 may be connected to an opposite side of the third resistor R3 and a control terminal of the second switching element Q2, and an output terminal (emitter terminal) of the first switching element Q1 may be grounded.

A control terminal of the second switching element Q2 may be connected to an opposite side of the third resistor R3 and an input terminal of the first switching element Q1, an input terminal of the second switching element Q2 is connected to one side of the third resistor R3, one side of the first resistor R1, and the microphone contact terminal M_1, and an output terminal of the second switching element Q2 may be connected to the key recognition unit 113.

The first switching element Q1 of the above-configured switching circuit 140 may be switched according to a voltage value obtained by distributing a voltage input from the microphone contact terminal M_1 with a ratio of the first resistance R1 to the second resistance R2. For example, the first switching element Q1 may be switched on or off by Equation 6 when a key of the earphone 200 is not input.

$$\text{Voltage by Equation 1} \times \frac{R2}{R1 + R2} \geq V_{EV(ON)} \quad \text{Equation 6}$$

A voltage ($V_{EV(ON)}$) refers to a breakdown voltage, and the first switching element Q1 is a reference voltage by which the first switching element Q1 determined switching on or off.

When a key of the earphone 200 is not input, a voltage (=Voltage of Equation 1−R2/(R1+R2)) applied to the control terminal (base terminal) of the first switching element Q1 becomes a yield voltage ($V_{EV(ON)}$) such that the first switching element Q1 may be switching on. When the first switching element Q1 is switched on, a voltage (Voltage of Equation 1×(Resistance of Q1/(R3+Resistance of Q1))

lower than the yield voltage is applied to the control terminal (base terminal) of the second switching terminal Q2 such that the second switching element Q2 may be switched off. In this way, when the second switching element Q2 is switched off, an electrical connection between the microphone contact terminal M_1 and the key recognition unit 113 is interrupted (separated). For example, as indicated by a dotted line C of FIG. 2A, the microphone contact terminal M_1 of the ear jack interface 101 is grounded only through the third resistor R3 and the first switching element Q1 but is not connected to the key recognition unit 113. Accordingly, in an embodiment of the present disclosure, noise introduced from the key recognition unit 113 to the microphone contact terminal M_1 can be interrupted (prevented).

Meanwhile, the first switching element Q1 may be switched on or off by Equation 7 when any one (e.g., a first key S1) of the keys S1, S2, and S3 of the earphone 200 is input.

$$\text{Voltage by Equation } 2 \times \frac{R2}{R1 + R2} \geq V_{EV(ON)} \qquad \text{Equation 7}$$

When a first key S1 of the earphone 200 is input, a voltage applied to the control terminal of the first switching element Q1 may become a yield voltage or lower such that the first switching element Q1 may be switched off. When the first switching element Q1 is switched off, a voltage (Voltage of Equation 2×(Resistance of Q1/(R3+Resistance of Q1)) higher than the yield voltage is applied to the control terminal of the second switching terminal Q2 such that the second switching element Q2 may be switched on. In this way, when the second switching element Q2 is switched on, the microphone contact terminal M_1 of the ear jack interface 101 and the key recognition unit 113 may be electrically connected to each other as indicated by a dotted line D of FIG. 2B. Then, a voltage calculated in Equation 2 may be input to the key recognition unit 113 of the controller 110. The controller 110 may compare a voltage applied to the key recognition unit 113 with a voltage range stored in the key recognition table to determine whether the first key S1 is pushed. For example, when a voltage input to the key recognition unit 113 is 1.2 V and a voltage range of 1.1 V to 1.3 V is mapped with the first key S1 in the key recognition table, the controller 110 may determine that the first key S1 is pushed. If the key input is released then, the switching circuit 140 may return to a state of FIG. 2A.

Until now, a case of inputting the first key S1 has been described. It is understood by those skilled in the art that when the second key S2 or the third key S3 of the earphone 200 is input, only a voltage applied to the key recognition unit 113 is changed according to the type of the input key but the switching circuit 140 is operated as in the case of inputting the first key S1.

Although FIGS. 2A and 2B illustrate that the first switching element Q1 and the second switching element Q2 are Negative Positive Negative (NPN) type Bipolar Junction Transistors (BJTs), various embodiments of the present disclosure are not limited thereto. For example, the first switching element Q1 and the second switching element Q2 may be Positive Negative Positive (PNP) type BJTs, N-channel Field Effect Transistors (FETs), or P-channel FETs. Although FIGS. 2A and 2B illustrate that two single transistors are employed, a dual transistor Integrated Circuit (IC) including two transistors may be employed in another embodiment of the present disclosure.

Figure 3A:
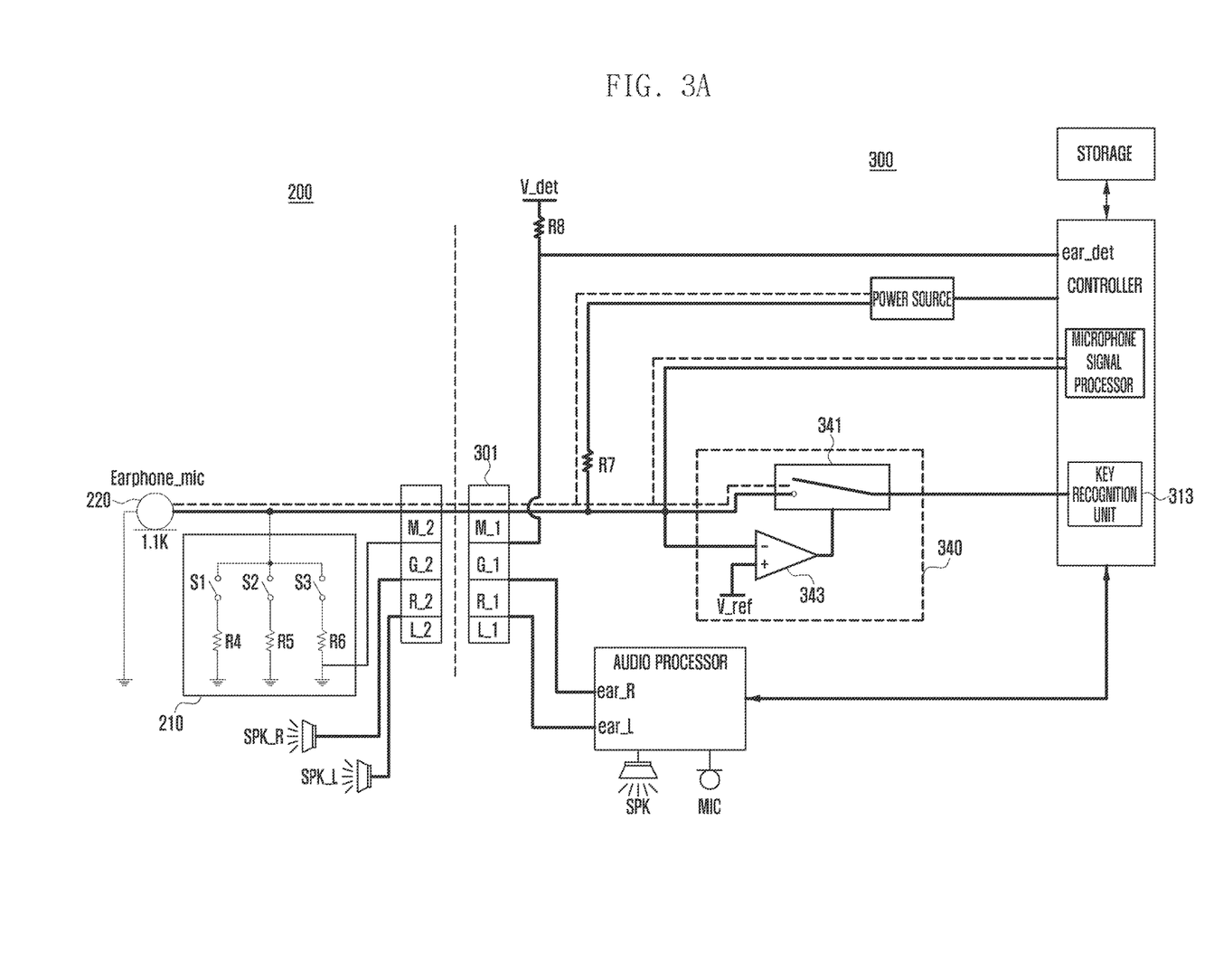
FIGS. 3A and 3B are views schematically illustrating an earphone and an electronic device according to an embodiment of the present disclosure.
Figure 3B:
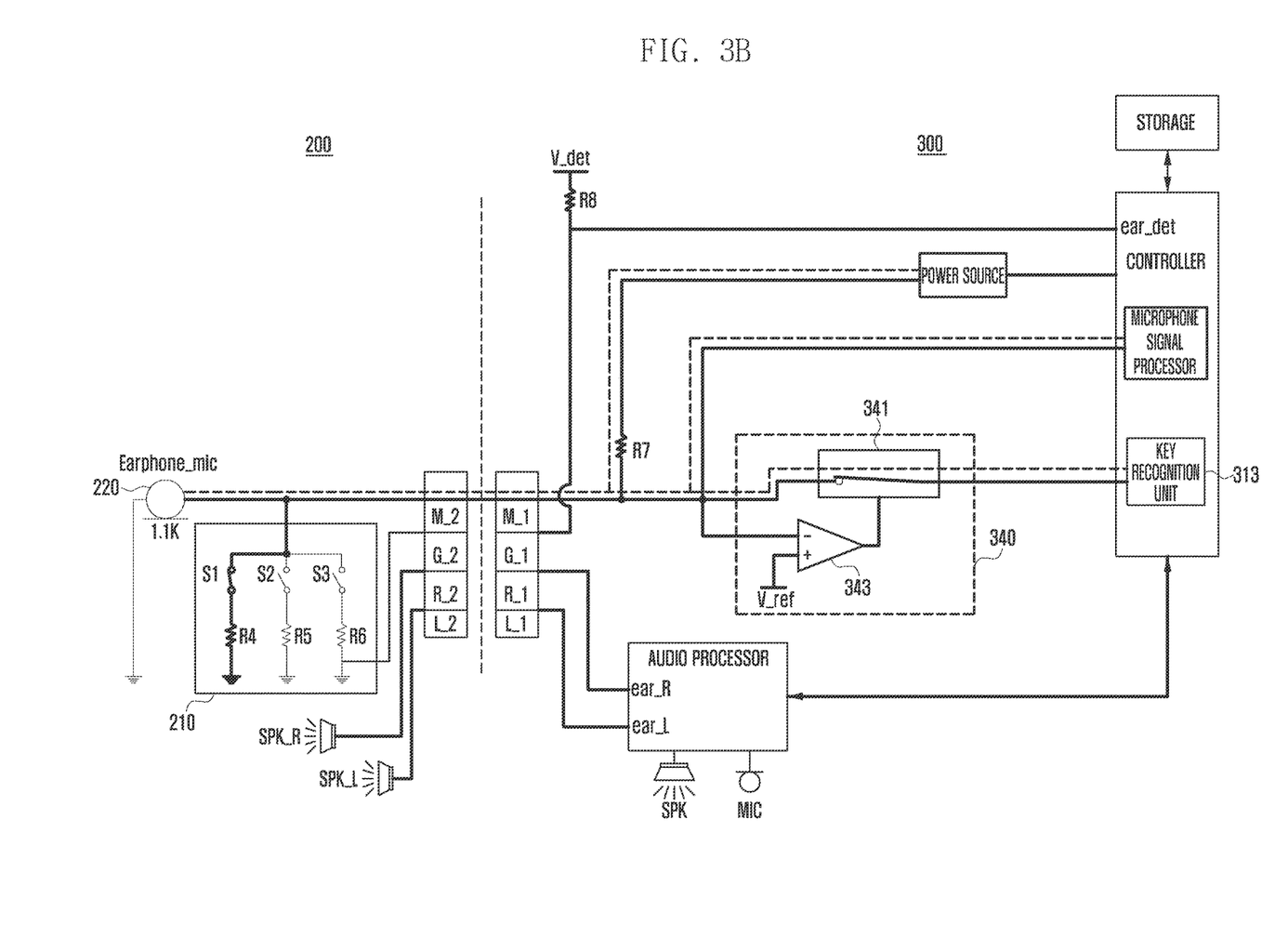

FIGS. 3A and 3B are views schematically illustrating an earphone and an electronic device according to an embodiment of the present disclosure. Hereinafter, a description of the same configurations as the configurations of FIGS. 2A and 2B will be omitted for convenience of description.

Referring to FIGS. 3A and 3B, the switching circuit 340 of the electronic device 300 according to an embodiment of the present disclosure may include a switch 341 and a comparator 343.

The switch 341 may be located between the microphone contact terminal M_1 of the ear jack interface 301 and the key recognition unit 313. For example, the switch 341 may be a Single Pole Single Throw (SPST) switch that is switched on or off according to an output signal of the comparator 343. In detail, an input terminal of the switch 341 may be connected to the microphone output terminal M_1 of the ear jack interface 301, an output terminal of the switch 341 may be connected to the key recognition unit 313, and a control terminal of the switch 341 may be connected to an output terminal of the comparator 343.

The comparator 343 may output a high signal when a voltage input to a non-reversal input terminal (+) is higher than a voltage input to a reversal input terminal (−), and may output a low signal in an opposite case.

The comparator 343 according to an embodiment of the present disclosure may compare a voltage applied to the microphone contact terminal M_1 of the ear jack interface 301 with a preset reference voltage V_ref to control switching on or off of the switch 341. In detail, the comparator 343 may include a reversal input terminal (−) connected to the microphone output terminal M_1 of the ear jack interface 301 and a non-reversal input terminal (+) to which a reference voltage V_ref is input. The reference voltage V_ref is be set to be lower than a voltage (Equation 1) applied to the microphone output terminal M_1 when a key is not input, and may be set to be higher than a voltage (Equations 2, 4, and 5) applied to the microphone output terminal M_1 when a key is input. For example, when a voltage applied of the microphone output terminal M_1 is 1.8 V when a key is not input and voltages applied to the microphone output terminal M_1 are 1.5 V, 1.2 V, and 1.0 V when the first key S1, the second key S2, and the third key S3 are input, the reference voltage V_ref may be set to be higher than 1.5 V and lower than 1.8 V (e.g., 1.65 V).

Because a voltage (e.g., 1.8 V) applied to the microphone output terminal M_1 is higher than a reference voltage (e.g., 1.65 V) when a key is not input, the comparator 343 may output a low signal. As illustrated in FIG. 3A, when the comparator 343 outputs the low signal, the switch 341 may be switched off to interrupt a transmission path of the key signal.

Because a voltage (e.g., any one of 1.5 V, 1.2 V, and 1.0 V) applied to the microphone output terminal M_1 is higher than a reference voltage (e.g., 1.65 V) when a key is input, the comparator 343 may output a high signal. As illustrated in FIG. 3B, when the comparator 343 outputs a high signal, the switch 341 may be switched on to connect a transmission path of the key signal.

As described above, the electronic device according to various embodiments of the present disclosure may include a switching circuit for preventing introduction of noise. The switching circuit of the electronic device can electrically separate the microphone contact terminal from the key recognition unit when a key of the earphone is not input. Meanwhile, if at least one of the keys of the earphone is input, the switching circuit of the electronic device can electrically connect the microphone contact terminal and the key recognition unit. In this way, the unnecessary introduction of noise can be prevented in the electronic device according to an embodiment of the present disclosure, because the microphone contact terminal and the key recognition unit are electrically connected to each other only when a key of the earphone is input.

While the present disclosure has been shown and described with reference to various embodiments thereof, it will be understood by those skilled in the art that various changes in form and details may be made therein without departing from the spirit and scope of the present disclosure as defined by the appended claims and their equivalents.

What is claimed is:

1. An electronic device having a noise removal function, the electronic device comprising:
    an ear jack interface configured to operatively connect with an earphone;
    a key recognition unit selectively connected to a microphone contact terminal of the ear jack interface, the key recognition unit being configured to recognize a key input of the earphone; and
    a switching circuit configured to electrically connect or interrupt the key recognition unit to or from the microphone contact terminal depending on whether the key of the earphone is input or not.

2. The electronic device of claim 1, wherein the switching circuit electrically interrupts the key recognition unit from the microphone contact terminal when a key of the earphone is not input, and
    wherein the switching circuit electrically connects the key recognition unit to the microphone contact terminal when a key of the earphone is input.

3. The electronic device of claim 2, wherein the switching circuit comprises:
    a switch located between a microphone contact terminal of the ear jack interface and the key recognition unit; and
    a comparator configured to control switching on or off of the switch depending on whether the key of the earphone is input or not.

4. The electronic device of claim 3, wherein the comparator compares a voltage applied to a microphone contact terminal of the ear jack interface with a preset reference voltage to control switching on or off of the switch.

5. The electronic device of claim 4, wherein the comparator includes a reversal terminal connected to the microphone contact terminal of the ear jack interface and a non-reversal terminal to which a reference voltage is input.

6. The electronic device of claim 1, wherein the switching circuit comprises:
    a first resistor including one side that is connected to a microphone contact terminal of the ear jack interface;
    a second resistor including one side that is connected to the first resistor and an opposite side that is grounded;
    a third resistor including one side that is connected to a microphone contact terminal of the ear jack interface;
    a first switching element including:
        a control terminal that is connected to the opposite side of the first resistor and the one side of the second resistor,
        an input terminal that is connected to an opposite side of the third resistor, and
        an output terminal that is grounded; and
    a second switching element including:
        a control terminal that is connected to the opposite side of the third resistor,
        an input terminal that is connected to the one side of the third resistor, and
        an output terminal that is connected to the key recognition unit.

7. The electronic device of claim 6, wherein when a key of the earphone is not input, the first switching element is switched on and the second switching element is switched off such that the microphone contact terminal and the key recognition unit are electrically interrupted from each other.

8. The electronic device of claim 6, wherein, when a key of the earphone is input, the first switching element is switched off and the second switching element is switched on such that the microphone contact terminal and the key recognition unit are electrically connected to each other.

9. The electronic device of claim 6, wherein the first switching element is switched depending on a voltage value obtained by distributing a voltage input from the microphone contact terminal with the first resistor and the second resistor.

10. The electronic device of claim 9, wherein a voltage input from the microphone contact terminal is a voltage obtained by distributing a microphone bias voltage for driving the microphone with a bias resistor and a microphone resistor when a key of the earphone is not input, and is a voltage obtained by distributing the microphone bias voltage with the bias resistor, the microphone resistor, and a resistor of a key when the key is input.

11. The electronic device of claim 6, wherein the second switching element is switched depending on a voltage between the third resistor and the first switching element.

* * * * *